United States Patent
Hiroki et al.

(10) Patent No.: US 8,590,861 B2
(45) Date of Patent: Nov. 26, 2013

(54) GATE VALVE AND SUBSTRATE PROCESSING APPARATUS EQUIPPED WITH THE SAME

(75) Inventors: Tsutomu Hiroki, Yamanashi (JP); Masaaki Nose, Nara (JP); Masanao Matsushita, Tokyo (JP); Takehiro Nishiba, Tokyo (JP)

(73) Assignee: Tokyo Electron Limited, Tokyo (JP)

( * ) Notice: Subject to any disclaimer, the term of this patent is extended or adjusted under 35 U.S.C. 154(b) by 0 days.

(21) Appl. No.: 13/258,519

(22) PCT Filed: Mar. 29, 2010

(86) PCT No.: PCT/JP2010/055599
§ 371 (c)(1),
(2), (4) Date: Oct. 19, 2011

(87) PCT Pub. No.: WO2010/113891
PCT Pub. Date: Oct. 7, 2010

(65) Prior Publication Data
US 2012/0055400 A1     Mar. 8, 2012

(30) Foreign Application Priority Data
Mar. 31, 2009    (JP) .................................. 2009-087140

(51) Int. Cl.
*F16K 25/00*    (2006.01)

(52) U.S. Cl.
USPC ............................ 251/158; 251/203; 251/332

(58) Field of Classification Search
USPC ........................... 251/332, 334, 158, 203–204
See application file for complete search history.

(56) References Cited

U.S. PATENT DOCUMENTS

| | | | | |
|---|---|---|---|---|
| 5,172,722 A | * | 12/1992 | Nishimura | ............... 137/599.16 |
| 6,494,229 B2 | * | 12/2002 | Kajitani | ......................... 137/530 |
| 2001/0054484 A1 | * | 12/2001 | Komino | ......................... 156/345 |
| 2002/0088959 A1 | | 7/2002 | Duelli | |
| 2005/0006610 A1 | * | 1/2005 | Sakurai et al. | ............... 251/63.6 |
| 2005/0121206 A1 | * | 6/2005 | Dolan | ............................. 169/37 |
| 2005/0274923 A1 | | 12/2005 | Tanase et al. | |
| 2005/0279956 A1 | | 12/2005 | Berger et al. | |

(Continued)

FOREIGN PATENT DOCUMENTS

| | | |
|---|---|---|
| CN | 1755175 | 4/2006 |
| JP | 60-13960 | 1/1985 |

(Continued)

OTHER PUBLICATIONS

International Search Report mailed on Apr. 27, 2010.

*Primary Examiner* — Eric Keasel
*Assistant Examiner* — David Colon Morales
(74) *Attorney, Agent, or Firm* — IPUSA, PLLC (57) ABSTRACT

A gate valve apparatus is disclosed. The gate valve apparatus is provided with a valve casing that includes a first valve seat and a second valve seat, and in which an opening portion is formed; and a closure element that includes a sealing member that contacts the first valve seat to seal the opening portion. In addition, the gate valve apparatus is provided with a shutoff member that contacts the second valve seat to thereby be deformed, so that a space between the opening portion and a sealing member is shut off by the shutoff member when the closure element closes the opening portion. The shutoff member is deformed and continues to contact the second valve seat under normal and high temperature environments when the closure element closes the opening portion.

14 Claims, 7 Drawing Sheets

(56) References Cited

U.S. PATENT DOCUMENTS

| | | |
|---|---|---|
| 2006/0182534 A1 | 8/2006 | Hiroki |
| 2007/0204958 A1* | 9/2007 | Lee et al. ................ 156/345.31 |
| 2009/0025878 A1* | 1/2009 | Rauf et al. ............... 156/345.48 |
| 2009/0114153 A1* | 5/2009 | Kurita et al. .................. 118/722 |
| 2009/0189107 A1* | 7/2009 | Nishiba ........................ 251/226 |

FOREIGN PATENT DOCUMENTS

| | | |
|---|---|---|
| JP | 2001-004039 | 1/2001 |
| JP | 2002-228043 | 8/2002 |
| JP | 2006-170373 | 6/2006 |
| JP | 2008-045640 | 2/2008 |
| WO | WO 2008018405 A1 * | 2/2008 |

* cited by examiner

GATE VALVE AND SUBSTRATE PROCESSING APPARATUS EQUIPPED WITH THE SAME

TECHNICAL FIELD

The present invention relates to a gate valve to be used in a process chamber in which a semiconductor wafer or the like goes through a predetermined process, and a substrate processing apparatus equipped with the same.

BACKGROUND ART

In a semiconductor device process, a plasma process is quite often used in order to decompose compounds when carrying out a film deposition process, an etching process, a cleaning process, and the like. When a compound is decomposed by plasma, radicals (free radicals, or atoms or the like with an unpaired electron) are produced. The radicals have relatively high thermal energy and extremely high reactivity, and are less likely to lose their thermal energy even when they hit, for example, an inner wall of a vacuum chamber several times. Therefore, a sealing member such as a packing member or the like in the vacuum chamber may be degraded by the radicals.

There is a gate valve that is provided with plural sealing members on the same surface of a closure element, as an example of a related art gate valve (see Patent Document 1 below). The sealing members include a sealing ring and a support ring that is located inside the sealing ring. When the closure element is closed, a pressing force applied onto the sealing ring from a valve seat is adjusted by the support ring.
Patent Document 1: Japanese Patent Application Laid-Open Publication No. 2002-228043.

SUMMARY OF INVENTION

Problems to be Solved by the Invention

However, in the conventional gate valve, the support ring tends to be worn thereby to produce particles when it contacts a surface of the valve seat and is pressed with a load applied from the closure element, because the support ring, which may be made of fluorine resin, does not have high flexibility or elasticity.

The present invention is directed to provide a gate valve that can prevent degradation of a sealing member from being attacked and prevent microwave leakage, and a substrate processing apparatus equipped with the gate valve.

Means of Solving the Problems

A first aspect of the present invention provides a gate valve apparatus including a valve casing that includes a first valve seat and a second valve seat, and in which an opening portion is formed; a closure element that is capable of closing the opening portion; a sealing member that is provided in the closure element, and contacts the first valve seat thereby to seal the opening portion when the closure element closes the opening portion; and a shutoff member that is made of a thin metal plate and attached in the closure element, and contacts the second valve seat thereby to shut off a space between the opening portion and the sealing member when the closure element closes the opening portion.

A second aspect of the present invention provides a substrate processing apparatus that utilizes electromagnetic waves thereby to process a substrate. The substrate processing apparatus includes a process chamber that has an opening portion that allows the substrate to pass therethrough; and the gate valve apparatus that is attached in the process chamber thereby to open or close the opening portion.

MODE(S) FOR CARRYING OUT THE INVENTION

According to an embodiment of the present invention, a sealing member is prevented from being degraded by radical attacks and electromagnetic waves (microwaves) are prevented from being leaked.

Non-limiting, exemplary embodiments of the present invention will now be described with reference to the accompanying drawings. In all the accompanying drawings, the same or corresponding reference symbols are given to the same or corresponding members or components, and thus repetitive explanation is omitted.

As shown in FIGS. 1 through 4, a side wall 16 that defines a process chamber 12 has an oblong process chamber side opening portion 18 through which a semiconductor wafer passes thereby to be transferred in and out from the process chamber 12. A side wall 20 that defines a transfer chamber 14 that is in gaseous communication with the process chamber 12 has a transfer chamber side opening portion 24. A gate valve apparatus 10 has a valve casing 26 that has a shape of a substantial rectangular parallelepiped and is made of an electrically highly conductive material such as aluminum, iron, copper and the like.

Figure 1:
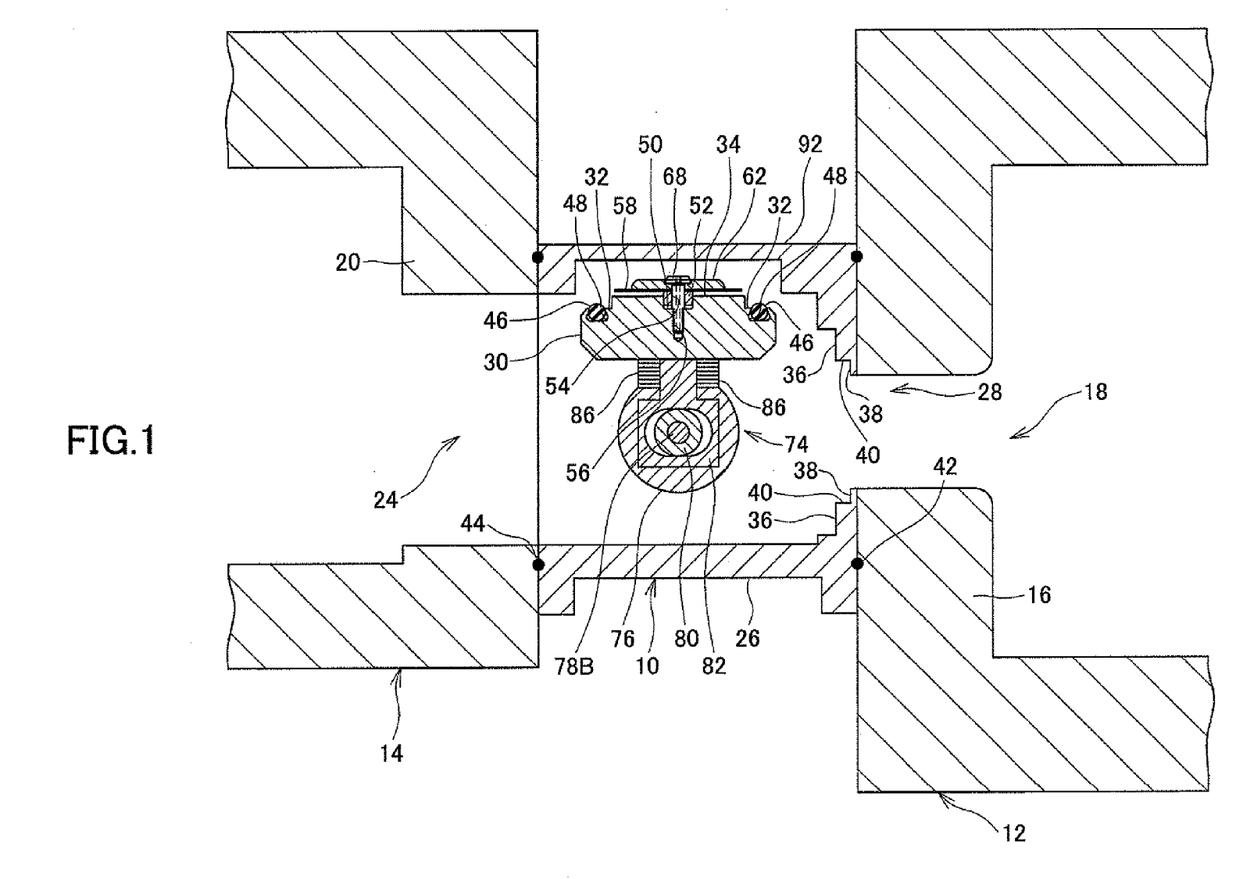
FIG. 1 is an enlarged cross-sectional view illustrating how a gate valve apparatus according to one embodiment of the present invention is attached.

An oblong opening portion 28 that is in gaseous, communication with the process chamber 12 is formed in one side wall of the valve casing 26. In the vicinity of the opening portion 28 of the valve casing 26, a first valve seat 36 on which a sealing member 46 mounted in a closure element 30 is seated, and a second valve seat 38 on which a shutoff member 58 mounted in the closure element 30 is seated. Specifically, the second valve seat 38 is formed in a position that protrudes toward the process chamber side opening portion 18 and is located inside the first valve seat 36 (or the side of the opening portion 28). The first valve seat 36 and the second valve seat 38 have flat surfaces. A step portion 40 is formed at a boundary between the first valve seat 36 and the second valve seat 38. Incidentally, an O-ring 42 is provided on joint surfaces of the process chamber 12 and the valve casing 26, thereby maintaining air-tightness between the process chamber 12 and the gate valve apparatus 10. An O-ring 44 is provided on joint surfaces of the transfer chamber 14 and the valve casing 26, thereby maintaining air-tightness between the transfer chamber 14 and the gate valve apparatus 10.

Incidentally, the first valve seat 36 and the second valve seat 38 have preferably gone through a predetermined surface treatment (e.g., an anodization treatment). With this, wearing of the first valve seat 36 and the second valve seat 38, which is caused by allowing the closure element 30 to be seated on the first valve seat 36 and the second valve seat 38, is reduced. In addition, such wearing may be reduced by polishing the first valve seat 36 and the second valve seat 38.

A closure element driving mechanism 74 that drives the closure element 30 is provided in the valve casing 26 thereby to close the opening portion 28 with the closure element 30 when necessary. The process chamber side opening portion 18 is also closed or opened by opening or closing the opening portion 28 with the closure element 30, because the opening portion 28 and the process chamber side opening portion 18 are in gaseous communication with each other.

There are provided a first surface 32 that opposes the first valve seat 36 of the valve casing 26 when the opening portion 28 is closed, and a second surface 34 that protrudes from a center portion of the first surface 32 and opposes the second valve seat 38 when the opening portion 28 is closed. A mounting groove 48 for mounting the sealing member 46 is formed in the first surface 32. The sealing member 46 made of an elastic material is mounted in the mounting groove 48.

Incidentally, the sealing member 46 is made of, for example, a fluoro-rubber (FKM), perfluoroelastomer (FFKM), or the like. The sealing member 46 made of the fluorinated rubber (FKM) can have relatively high thermal resistance and oil resistance. In addition, the sealing member 46 made of perfluoroelastomer (FFKM) can have relatively high thermal resistance and chemical resistance, and relatively high resistance to radicals.

A hole portion 50 is formed in a center portion of the second surface 34 of closure element 30. A spacer 52 is mounted in the hole portion 50. A tip portion of the spacer 52 mounted in the hole portion 50 projects from the second surface 34. A through-hole 54 through which a shaft portion 72 of a screw 68 (not shown in FIG. 1, but see FIG. 4) passes is formed in a center portion of the spacer 52. In addition, a screw groove 56 into which the shaft portion 72 of the screw 68 is screwed is formed in the hole portion 50.

A shutoff member 58 is arranged on an upper portion of the spacer 52. The shutoff member 58 is formed of metal (e.g., aluminum, iron, copper, or the like) having an electrical conductivity, and is deformed with pressure of a predetermined degree. Incidentally, the shutoff member 58 may have a shape of a thin plate or a thin corrugated plate. A through-hole 60 (not shown in FIG. 1, but see FIG. 4) through which the shaft portion 72 of the screw 68 passes is formed in the shutoff member 58. In addition, a fixing member 62 is arranged on a front surface of the shutoff member 58. In other words, the shutoff member 58 is caught between the spacer 52 and the fixing member 62 from above and below. A through-hole 64 (not shown in FIG. 1, but see FIG. 4) through which the shaft portion 72 of the screw 68 passes and a concave portion 66 in which a head portion 70 (not shown in FIG. 1, but see FIG. 4) of the screw 68 that has passed through the through-hole 64 is seated are formed in the fixing member 62.

Incidentally, fluorine resin is applied or coated on the front surface of the shutoff member 58. Degradation of the shutoff member 58, which can be caused by plasma or radicals, can be prevented by covering the front surface of the shutoff member 58 with the fluorine resin.

Figure 4:
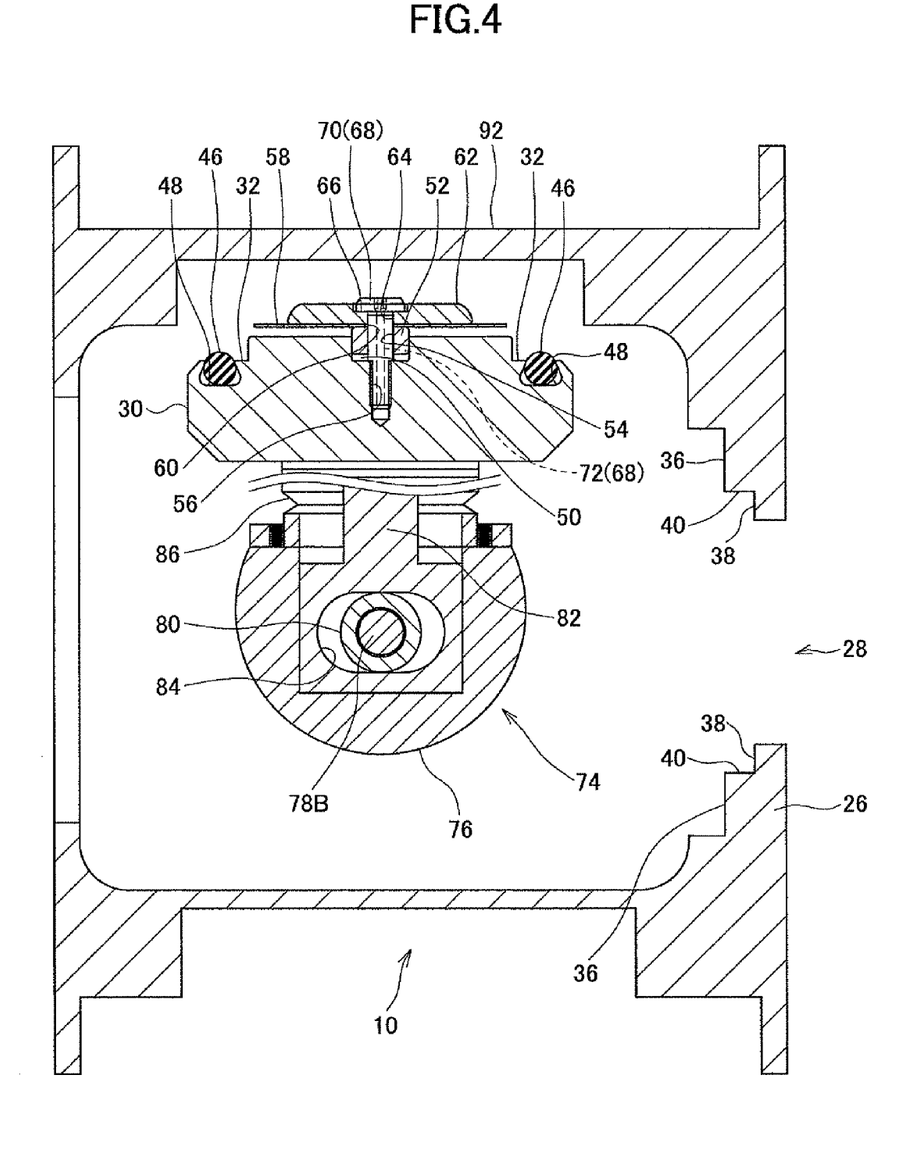
FIG. 4 is a cross-sectional view illustrating a closure element positioned in a reference position (OPEN state) in the gate valve apparatus according to one embodiment of the present invention.

As shown in FIG. 4, the screw 68 is inserted into the through-hole 64 of the fixing member 62. The screw 68 is formed of an electrically highly conductive metal, and has the head portion 70 and the shaft portion 72. When the screw 68 is inserted through the through-hole 64 of the fixing member 62 and screwed into the screw groove 56, the head portion 70 of the screw 68 is seated in the concave portion 66 of the fixing member 62, and the shaft portion 72 passes through the through-hole 64 of the fixing member 62. In addition, the shaft portion 72 of the screw 68 passes through the through-hole 60 of the shutoff member 58 and the through-hole 54 of the spacer 52, and is screwed into the screw groove 56. As stated, the shutoff member 58 is thinly attached on a portion closer to the center portion of the closure element 30 than (or inside) the sealing member 46 of the closure element 30.

When the shutoff member 58 is attached in the closure element 30, the front surface of the shutoff member 58 contacts the fixing member 62, and a lower surface of the shutoff member 58 is away from the second surface 34 by a predetermined distance. Namely, the shutoff member 58 and the second surface 34 of the closure element 30 are away from each other, so that the shutoff member 58 is allowed to be deformed (or warped) without being interfered with, when the closure element 30 closes the opening portion 28 under a normal temperature environment and the shutoff member 58 is deformed (or warped) toward the second surface 34 by pressure from the first valve seat 36.

Incidentally, the spacer 52 and the fixing member 62 are made of an electrically highly conductive metal (e.g., aluminum, iron, copper, or the like) in a similar manner as the shutoff member 58.

The sealing member 46 contacts and is pressed onto the first valve seat 36 of the valve casing 26 with predetermined pressure, and is deformed with pressure (sealing reaction force) as a reaction force from the first valve seat 36, thereby sealing the opening portion 28 in an air-tight manner.

In addition, the shutoff member 58 contacts and is pressed onto the second valve seat 38 of the valve casing 26 with predetermined pressure, and is warped (elastically deformed) with pressure (sealing reaction force) as a reaction force from the second valve seat 38.

As shown in FIG. 1, in the vicinity of both end portions in a longitudinal direction of the closure element 30 (in a vertical direction of the paper), the closure element driving mechanism 74 that pivots or moves along a radius direction of the closure element 30 with respect to the valve casing 26. The closure element driving mechanism 74 is explained in the following.

Figure 2:
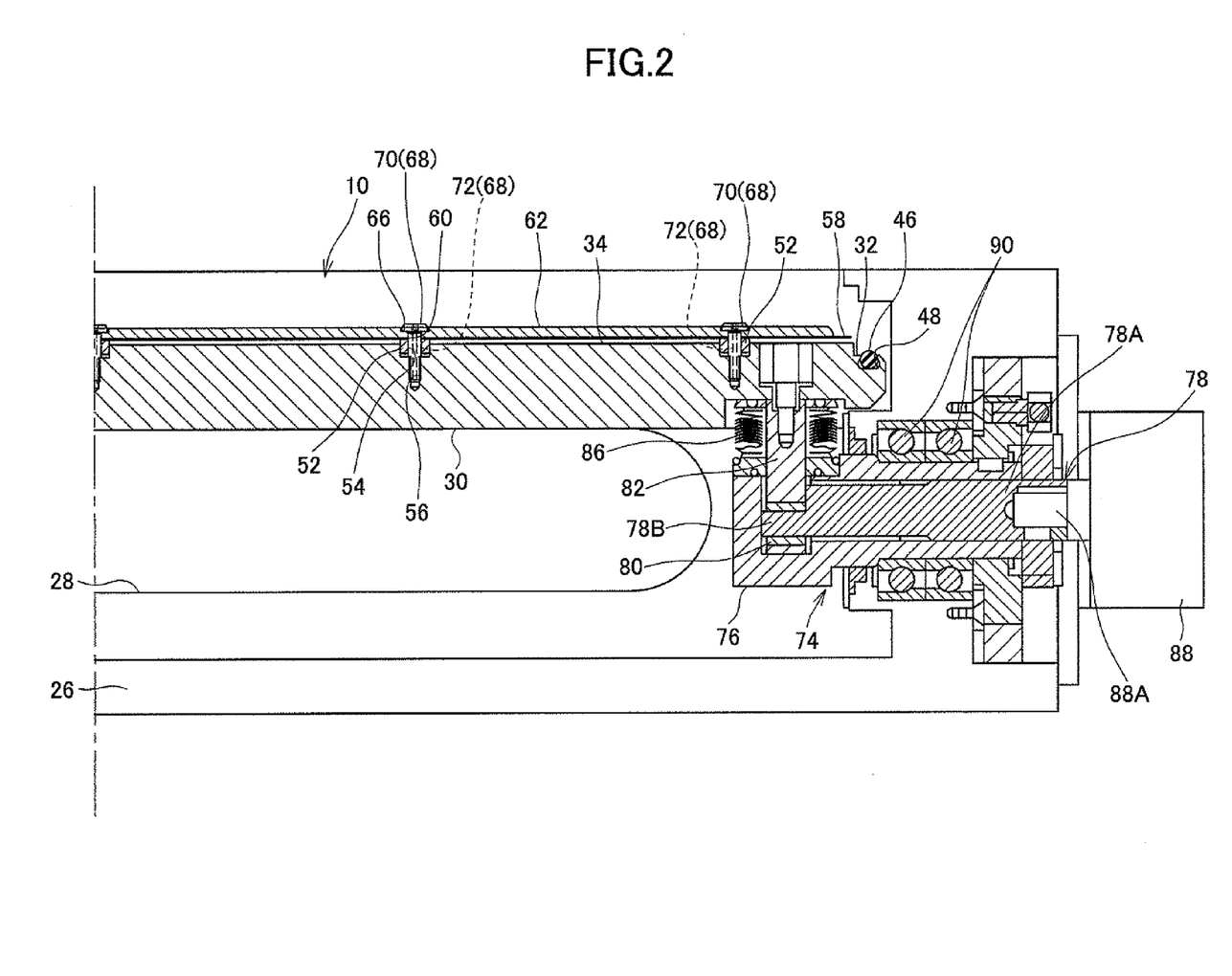
FIG. 2 is a partial enlarged view illustrating a primary portion of the gate valve apparatus according to one embodiment of the present invention.
Figure 3:
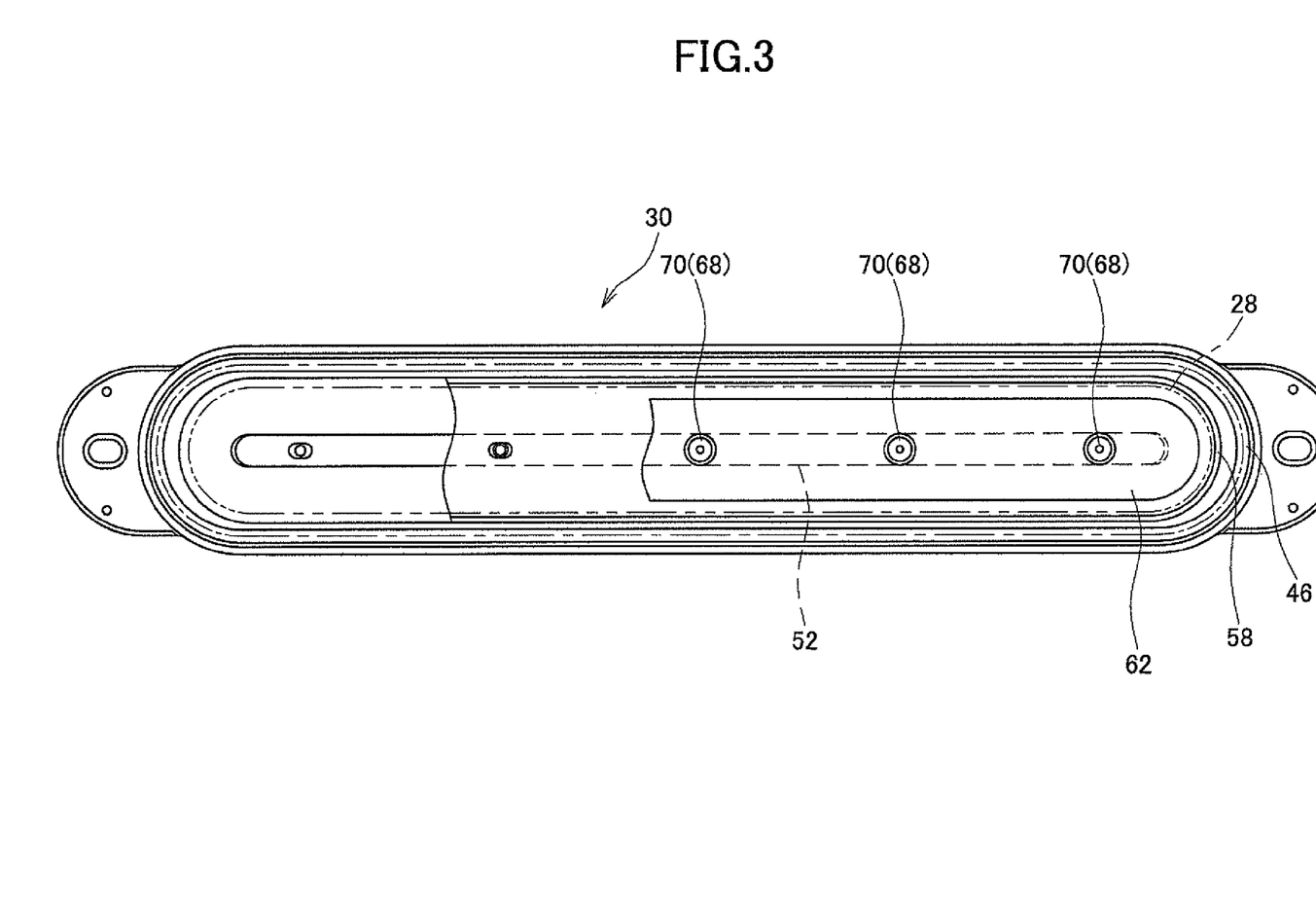
FIG. 3 is a front view of the gate valve apparatus according to one embodiment of the present invention.

As shown in FIGS. 1 and 2, the closure element driving mechanism 74 is provided with hollow supporting portions 76 attached on both end portions in the longitudinal direction of the closure element 30. The supporting portion 76 is pivotably supported by bearings 90 of the valve casing 26, and slidably supports a supporting piece 82. In addition, an eccentric shaft 78 is pivotably arranged by way of the bearings 90 within the supporting portion 76. The eccentric shaft 78 is provided with a shaft body portion 78A and an eccentric shaft portion 78B whose center is located away from the center (shaft center) of the shaft body portion 78A by a predetermined distance. A roller 80 is arranged on an outer circumference of the eccentric shaft portion 78B by way of a slide bearing, and the supporting piece 82 is attached on an outer circumference of the roller 80. In other word, the supporting piece 82 is provided with an inserting portion 84 into which the roller 80 is inserted and the eccentric shaft portion 78B is pivotably inserted into the inserting portion 84 (see FIG. 4). The supporting piece 82 has a convex portion that is connected to the closure element 30. Incidentally, the supporting piece 82 and the closure element 30 are coupled with each other by way of a fixing member such as bolts or screws. In addition, the supporting portion 76 is provided with a bellows 86 that surrounds the outer circumference of the supporting piece 82. The bellows 86 expands when the closure element 30 is moved outward along a radius direction of the eccentric shaft portion 78B and the roller 80, and shrinks when the closure element 30 is moved inward along the radius direction.

Referring to FIG. 2, a driving motor 88 is attached in the valve casing 26. The driving motor 88 is provided with a motor rotational shaft 88A that rotates in one direction or in the opposite direction. The motor rotational shaft 88A is connected to the shaft body portion 78A of the eccentric shaft 78. The eccentric shaft 78 is rotated around a rotational center of the motor rotational shaft 88A in one direction or in the opposite direction by rotation of the motor rotational shaft 88A.

Next, operations of the gate valve apparatus 10 according to this embodiment are explained. In the following explanation, when the closure element 30 is located to oppose a side wall 92 of the valve casing 26, which corresponds to a position that is deviated by 90° with respect to the opening portion 28 under a normal temperature environment (e.g., 25° C.), the closure element 30 may be expressed as being in a reference position (or in an OPEN state).

When the closure element 30 is located to oppose the side wall 92 (in the OPEN state) as shown in FIGS. 1 and 4, the eccentric shaft portion 78B of the eccentric shaft 78 is located in the opposite side of the side wall 92 (or on the inner side of the radius direction) with respect to the rotational center (the rotational center of the motor rotational shaft 88A).

Figure 5:
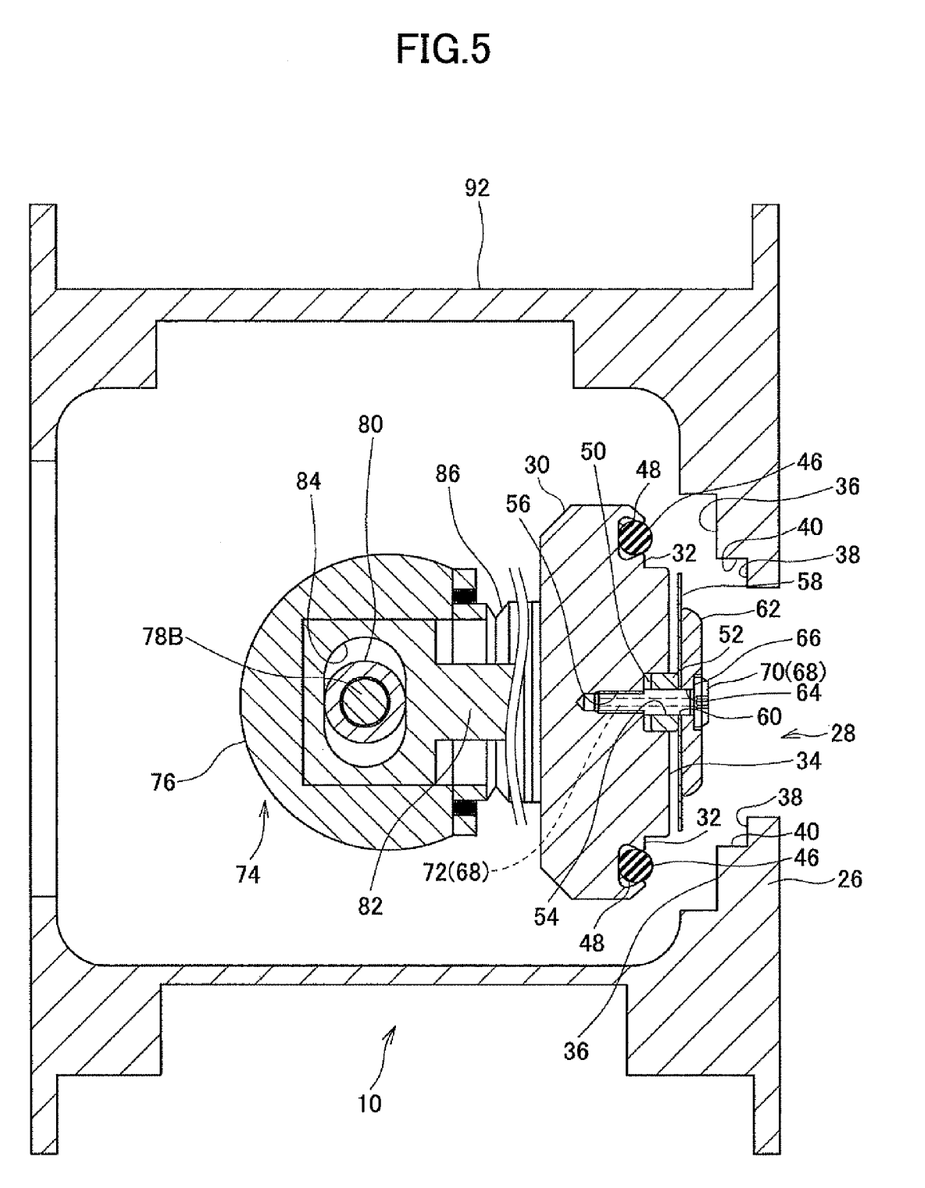
FIG. 5 is a cross-sectional view illustrating the closure element that has been rotated by 90° from the reference position shown in FIG. 4 (or the closure element in a state of opposing an opening portion).

Next, when the motor rotational shaft 88A and thus the eccentric shaft 78 are rotated by 90° by the driving motor 88, the supporting portion 76 is also rotated as shown in FIG. 5, and thus the closure element 30 comes to oppose the opening portion 28. In the following, the position of the closure element 30 shown in FIG. 5 is a position of 90°.

Figure 6:
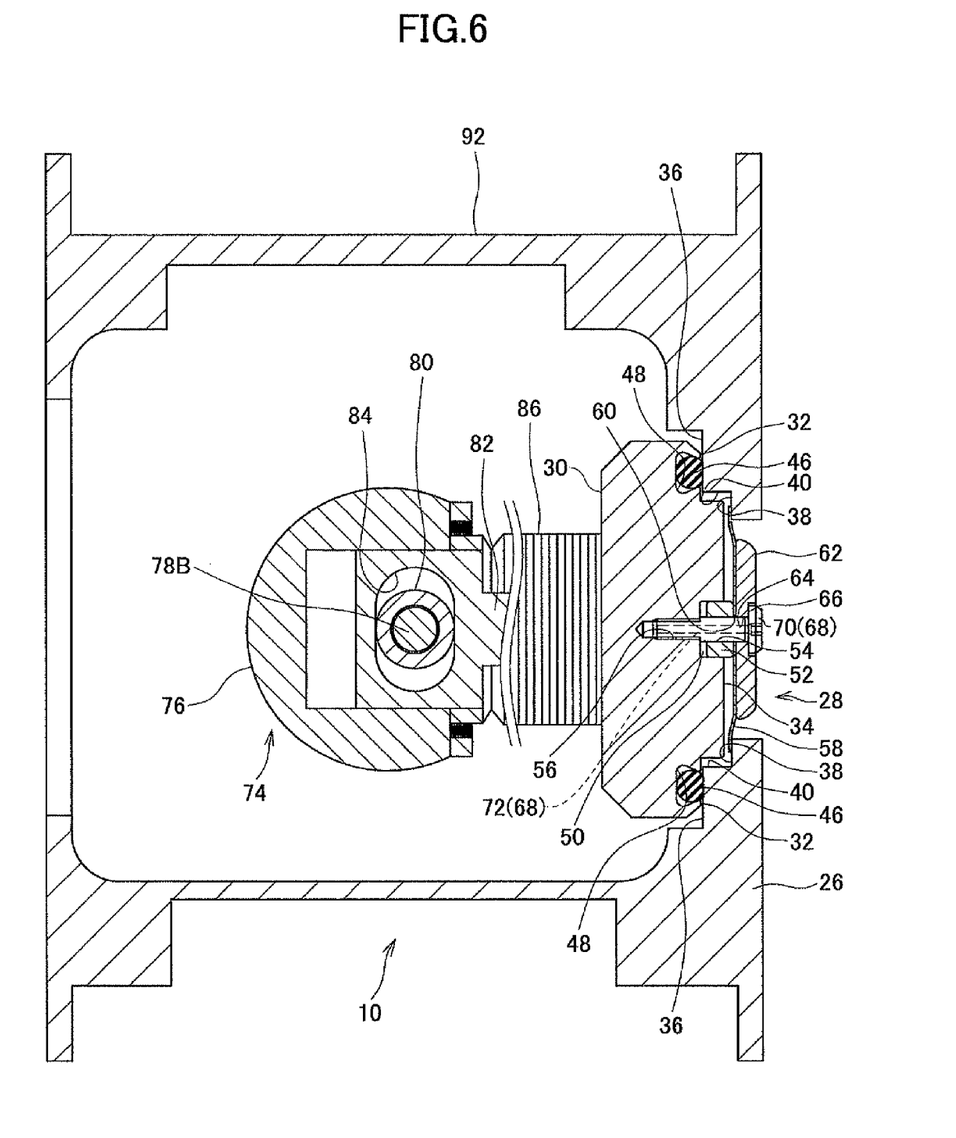
FIG. 6 is a cross-sectional view illustrating a position of the closure element when the opening portion is closed by the closure element of the gate valve apparatus according to one embodiment of the present invention.

Next, when the motor rotational shaft 88A of the driving motor 88 is further rotated in a positive direction, the eccentric shaft 78 is also rotated by a rotational force of the driving motor 88. When the eccentric shaft 78 is rotated by 180° from the position of 90°, the eccentric shaft portion 78B of the eccentric shaft 78 is shifted toward the opening portion 28 by a distance of an eccentric amount times 2, which corresponds to a diameter of the eccentric shaft portion 78B in this example. With this, the supporting piece 82 is shifted toward the opening portion 28 by the same distance, and as a result, the first surface 32 of the closure element 30 attached in the supporting piece 82 is seated in the first valve seat 36 in the vicinity of the opening portion 28, and the second surface 34 of the closure element 30 is seated in the second valve seat 38 as shown in FIG. 6, so that the opening portion 28 is closed (in a CLOSE state).

Here, when the first surface 32 of the closure element 30 is seated in the first valve seat 36 in the vicinity of the opening portion 28 and the second surface 34 of the closure element 30 is seated in the second valve seat 38 in the vicinity of the opening portion 28, so that the opening portion 28 is closed, predetermined pressure is applied onto the first valve seat 36 from the first surface 32 of the closure element 30, and onto the second valve seat 38 from the second surface 34. Therefore, the sealing member 46 arranged in the first surface 32 is elastically deformed (compressively deformed) by a reaction force from the first valve seat 36. In addition, a reaction force from the second valve seat 38 is applied onto an outer end portion of the shutoff member 58. Therefore, force directed toward the opening portion 28 is applied on a center portion of the shutoff member 58, and a reaction force from the second valve seat 38 is applied onto the outer end portion. In this case, the end portion of the shutoff member 58 is deformed (or curved) toward the second surface 34, or deformed to come close to the second surface 34. In this situation, while the shutoff member 58 is deformed, the end portion of the shutoff member 58 assuredly contacts the second valve seat 38.

Figure 7:
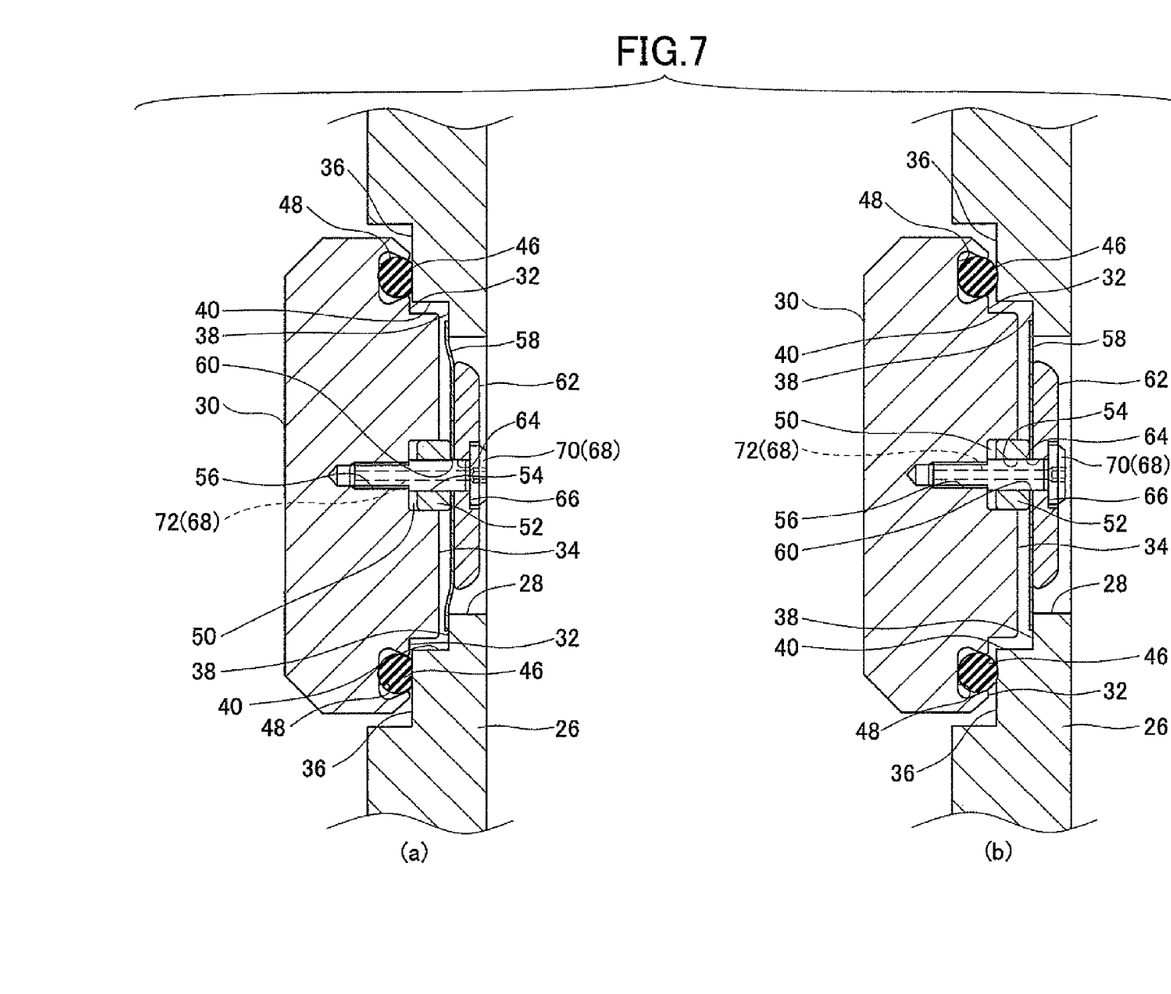
FIG. 7 is a partial cross-sectional view illustrating the closure elements that are seated on valve seats thereby to close the opening portion.

On the other hand, because the sealing member 46 is increased in volume due to thermal expansion under a higher temperature environment (e.g., 200° C.) as shown in Section (b) of FIG. 7, a reaction force applied from the first valve seat 36 is increased and thus an elastically deformed amount is increased. Therefore, the closure element 30 is slightly moved toward the inner side of the radius direction (or toward the inner side of the valve casing 26). In this case, the shutoff member 58 is moved toward the inner side of the radius direction together with the closure element 30. With this, while the warp of the shutoff member 58 is alleviated, the end portion of the shutoff member 58 continues to contact the second valve seat 38, because there remains strain deformation. As stated, the sealing member 46 contacts the first valve seat 36 and the shutoff member 58 contacts the second valve seat 38 even under a high temperature environment (e.g., 200° C.).

Next, when the closure element 30 that has seated on the opening portion 28 is released from the opening portion 28, the driving motor 88 rotates the motor rotational shaft 88A in a reverse direction and thus rotates the eccentric shaft 78 in the reverse direction. When the eccentric shaft 78 is rotated in the reverse direction by 180°, the eccentric shaft portion 78B of the eccentric shaft 78 is moved in an opposite direction from the opening portion 28 (or toward the inner side of the radius direction) by the distance of eccentric amount times 2, which corresponds to the diameter of the eccentric shaft portion 78B, and thus comes back to the position of 90°. With this the opening portion 28 is opened.

When the motor rotational shaft 88A of the driving motor 88 is further rotated in the reverse direction from the position of 90°, the eccentric shaft 78 is rotated together with the supporting portion 76 in the same direction. The supporting portion 76 is pivoted by 90° together with the eccentric shaft 78, and comes back to the position shown in FIG. 4. With this, the closure element 30 opposes the side wall 92, and the opening portion 28 is opened, so that the transfer chamber 14 and the process chamber 12 are in gaseous communication with each other by way of the gate valve apparatus 10.

Incidentally, "under a normal temperature environment" here may mean a range of 5° C. or more and 35° C. or less, specifically a range of 20° C. or more and 30° C. or less. In addition, "under a high temperature environment" may mean a range of 150° C. or more and 250° C. or less, specifically a range of 180° C. or more and 220° C. or less.

Next, effects and advantages of the gate valve apparatus 10 according to an embodiment of the present invention are explained.

As shown in Section (a) of FIG. 7, the sealing member 46 of the closure element 30 contacts the first valve seat 36 of the valve casing 26 thereby to apply a predetermined pressure onto the first valve seat 36, and the shutoff member 58 contacts the second valve seat 38 thereby to apply a predetermined pressure on the second valve seat 38. The shutoff member 58 experiences a reaction force from the second valve seat 38 and is thus deformed, so that the shutoff member 58 and the second valve seat 38 assuredly contact each other. Therefore, radicals produced in the process chamber 12 cannot enter the valve casing 26 from the opening portion 28 because the radicals are shut off by the shutoff member 58, even if the radicals try to move into the valve casing 26 through the opening portion 28. In such a manner, a space between the sealing member 46 and the opening portion 28 is completely shut off by the shutoff member 58 that assuredly contacts the second valve seat 38, so that gaseous communication between the sealing member 46 and the opening portion 28 is prevented. Therefore, the radicals cannot reach the sealing member 46 that is located in a more inner area of the valve casing 26 than that of the shutoff member 58, and thus the sealing member 46 is not exposed to the radicals. As a result, the sealing member 46 is prevented from being degraded by radical attack.

Specifically, because the shutoff member 58 contacts the second valve seat 38 while being deformed, even if there are errors in a pressing force applied onto the closure element 30 or errors in the sizes of the closure element (including the sealing member and the shutoff member) and the valve casing, such errors can be tolerated. As a result, the shutoff member 58 and the second valve seat 38 can contact each other, so that the sealing member 46 can be prevented from being degraded.

In addition, the front surface of the shutoff member 58 can be prevented from being corroded by the radicals or plasma because of being coated with fluorine resin. Moreover, because the first valve seat 36 and the second valve seat 38 of the valve casing 26 go through a predetermined treatment (e.g., an anodization treatment), wearing of the first valve seat 36 and the second valve seat 38, which may be caused when the closure element 30 is seated on the first valve seat 36 and the second valve seat 38, is reduced.

Furthermore, when the sealing member 46 is made of a fluoro-rubber (FKM), or perfluoroelastomer (FFKM), the sealing member 46 can have higher resistance against the radicals, and have a long service life.

Additionally, when the shutoff member 58, the valve casing 26, the spacer 52, and the fixing member 62 are made of an electrically highly conductive metal (e.g., aluminum, iron, copper, and the like), the shutoff member 58 and the second valve seat 38 of the valve casing 26 are electrically connected with each other when the shutoff member 58 contacts the second valve seat 38 of the valve casing 26. Therefore, electromagnetic waves (microwaves) produced in the process chamber during wafer processing can be prevented from being leaked out from the process chamber. Moreover, when the shutoff member 58 is made of an electrically highly conductive metal (e.g., aluminum, iron, copper, and the like), the shutoff member 58 can have high thermal conductivity, and thus heat can be easily transferred from the valve casing 26 to the closure element 30. As a result, it becomes difficult for reaction products to be adsorbed on the closure element 30. Therefore, there is a reduction of particles, which particles may be produced by causing the reaction products that have first been attached on the closure element to be peeled off and thrown away when the closure element 30 is closed or opened or vibrated.

On the other hand, the sealing member 46 experiences a larger reaction force from the first valve seat 36 under a high temperature environment (e.g., 200° C.) as shown Section (b) of FIG. 7, as explained above, and the closure element 30 is slightly moved toward the inner side of the valve casing 26. In this situation warp of the shutoff member 58 becomes alleviated. However, the end portion of the shutoff member 58 and the second valve seat 38 still contact each other, so that the attacks of the radicals or plasma onto the sealing member 46 is inhibited. At the same time, because the shutoff member 58 and the valve casing 26 are electrically connected, the electromagnetic waves are prevented from being leaked from the process chamber.

As stated, the shutoff member 58 is deformed when the closure element 30 closes the opening portion 28 under a normal temperature environment (e.g., 25° C.) and under a high temperature environment (e.g., 200° C.). With this, when the gate valve apparatus 10 is used under a high temperature environment and the closure element 30 is moved toward the inner side of the valve casing 26 because of thermal expansion of the sealing member 46, the shutoff member 58 and the second valve seat 38 are not moved away from each other, but continue to contact each other. As a result, the radicals are shut off by the shutoff member 58 even under a high temperature environment, so that the sealing member 46 is protected from the radicals attacks. In addition, because the shutoff member 58 and the valve casing 26 can remain electrically connected, electromagnetic wave leakage can be prevented.

As stated above, according to the gate valve apparatus 10 of this embodiment, the degradation of the sealing member 46, which is caused by the radical attacks, can be prevented. With this, maintenance frequency of the sealing members 46 can be reduced. As a result, time required for maintenance of the gate valve apparatus 10 can be greatly reduced, thereby increasing usage efficiency of the gate valve apparatus 10.

In addition, because the electromagnetic wave leakage can be prevented, electric power supplied to the process chamber 12 (or the electrodes or the like provided in the process chamber 12) can be increased, thereby widening a process window. With this, efficient film deposition processes can be carried out inside the process chamber 12, thereby improving process efficiency and throughput.

While the present invention has been explained with reference to the above embodiments, the present invention is not limited to the disclosed embodiments, but may be modified or altered within the scope of the accompanying claims.

This international application claims priority based on a Japanese Patent Application No. 2009-087140 filed on Mar. 31, 2009, the entire content of which is incorporated herein by reference in this international application.

The invention claimed is:

1. A gate valve apparatus comprising:
   a valve casing that includes a first valve seat and a second valve seat, and in which an opening portion is formed, the valve casing being made of a conductive metal;
   a closure element that is capable of closing the opening portion
   a sealing member that is provided in the closure element, and contacts the first valve seat thereby to seal the opening portion when the closure element closes the opening portion; and
   a shutoff member that is made of a thin conductive metal plate and attached in the closure element, and contacts the second valve seat thereby to shut off a space between the opening portion and the sealing member and to electrically connect the shutoff member with the valve casing through the second valve seat when the closure element closes the opening portion,
   wherein the shutoff member is caught between a spacer and a fixing member, the spacer being mounted on the closure element, and the shutoff member is attached to the closure element by a screw passing through the fixing member, the shutoff member and the spacer, and wherein the valve casing, the shutoff member, the fixing member, the spacer and the screw are made of conductive metal, and transfer heat from the valve casing to the closure element when the shutoff member closes the opening portion.

2. The gate valve apparatus of claim 1, wherein a surface of the shutoff member is coated with fluorine resin.

3. The gate valve apparatus of claim 1, further comprising a closure element driving mechanism that drives the closure element to either one of a first position where the closure element opposes an inner wall of the valve casing and a second position where the closure element opposes the opening portion.

4. The gate valve apparatus of claim 3, wherein the closure element driving mechanism comprises:
- a supporting piece that is coupled with a portion opposite to a position where the sealing member is provided in the closure element, and supports the closure element;
- a supporting portion that slidably supports the supporting piece and includes a hollow portion; and
- a shaft that includes a shaft body portion that rotatably supports the supporting portion by way of the hollow portion of the supporting portion, and an eccentric shaft portion that is eccentric from a rotational shaft of the shaft and is provided in the shaft body portion,
- wherein the eccentric shaft portion is eccentrically rotated along with rotation of the shaft in the supporting portion and acts on the supporting piece thereby to press the closure element to the opening portion.

5. The gate valve apparatus of claim 1, wherein the shutoff member is attached on the closure element leaving a clearance that allows the shutoff member to be deformed when the shutoff member contacts the second valve seat.

6. A substrate processing apparatus that utilizes electromagnetic waves thereby to process a substrate, the substrate processing apparatus comprising:
- a process chamber that has an opening portion that allows the substrate to pass therethrough; and
- the gate valve apparatus of claim 1 that is attached in the process chamber, and opens and closes the opening portion.

7. The gate valve apparatus of claim 1, further comprising:
- a step portion formed at a boundary between the first valve seat and the second valve seat.

8. The gate valve apparatus of claim 1, further comprising:
- a step portion formed at a boundary between the first valve seat and the second valve seat.

9. A gate valve apparatus comprising:
- a valve casing that includes a first valve seat and a second valve seat, and in which an opening portion is formed, each of the first valve seat and the second valve seat having a flat surface;
- a step portion formed at a boundary between the first valve seat and the second valve seat;
- a closure element that is capable of closing the opening portion;
- a sealing member that is provided in the closure element, and contacts the first valve seat thereby to seal the opening portion when the closure element closes the opening portion; and
- a shutoff member that is made of a thin metal plate and attached in the closure element, and contacts the second valve seat thereby to shut off a space between the opening portion and the sealing member when the closure element closes the opening portion,
- wherein the shutoff member is caught between a spacer and a fixing member, the spacer being mounted on the closure element, and the shutoff member is attached to the closure element by a screw passing through the fixing member, the shutoff member and the spacer, and
- wherein the valve casing, the shutoff member, the fixing member, the spacer and the screw are made of conductive metal, and transfer heat from the valve casing to the closure element when the shutoff member closes the opening portion.

10. The gate valve apparatus of claim 9, wherein a surface of the shutoff member is coated with fluorine resin.

11. The gate valve apparatus of claim 9, further comprising a closure element driving mechanism that drives the closure element to either one of a first position where the closure element opposes an inner wall of the valve casing and a second position where the closure element opposes the opening portion.

12. The gate valve apparatus of claim 11, wherein the closure element driving mechanism comprises:
- a supporting piece that is coupled with a portion opposite to a position where the sealing member is provided in the closure element, and supports the closure element;
- a supporting portion that slidably supports the supporting piece and includes a hollow portion; and
- a shaft that includes a shaft body portion that rotatably supports the supporting portion by way of the hollow portion of the supporting portion, and an eccentric shaft portion that is eccentric from a rotational shaft of the shaft and is provided in the shaft body portion,
- wherein the eccentric shaft portion is eccentrically rotated along with rotation of the shaft in the supporting portion and acts on the supporting piece thereby to press the closure element to the opening portion.

13. The gate valve apparatus of claim 9, wherein the shutoff member is attached on the closure element leaving a clearance that allows the shutoff member to be deformed when the shutoff member contacts the second valve seat.

14. A substrate processing apparatus that utilizes electromagnetic waves thereby to process a substrate, the substrate processing apparatus comprising:
- a process chamber that has an opening portion that allows the substrate to pass therethrough; and
- the gate valve apparatus of claim 9 that is attached in the process chamber, and opens and closes the opening portion.

* * * * *